Sept. 23, 1947. W. C. McNEILL, JR 2,427,971
LOADING MACHINE
Filed May 14, 1945 3 Sheets-Sheet 3
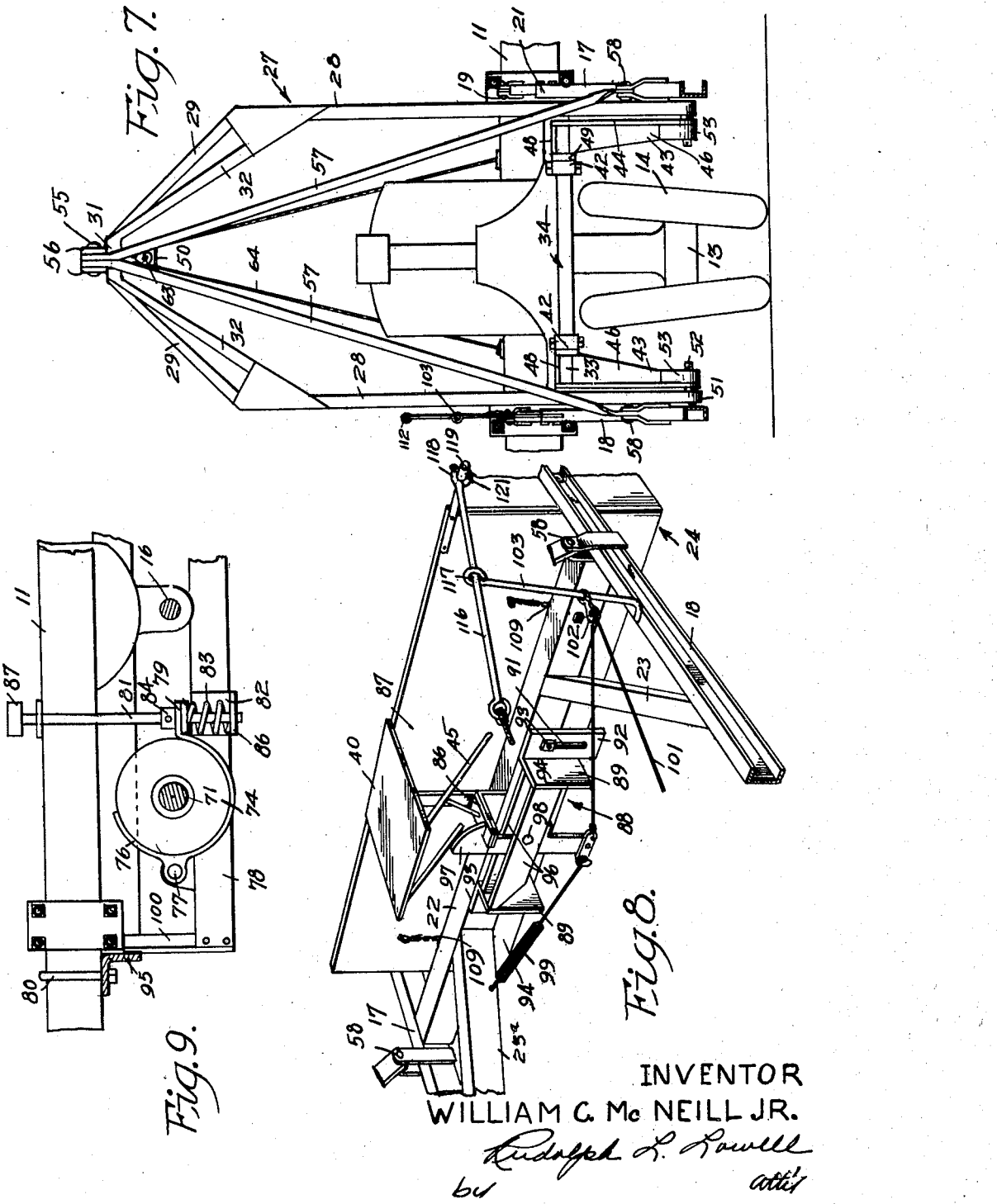
INVENTOR
WILLIAM C. McNEILL JR.

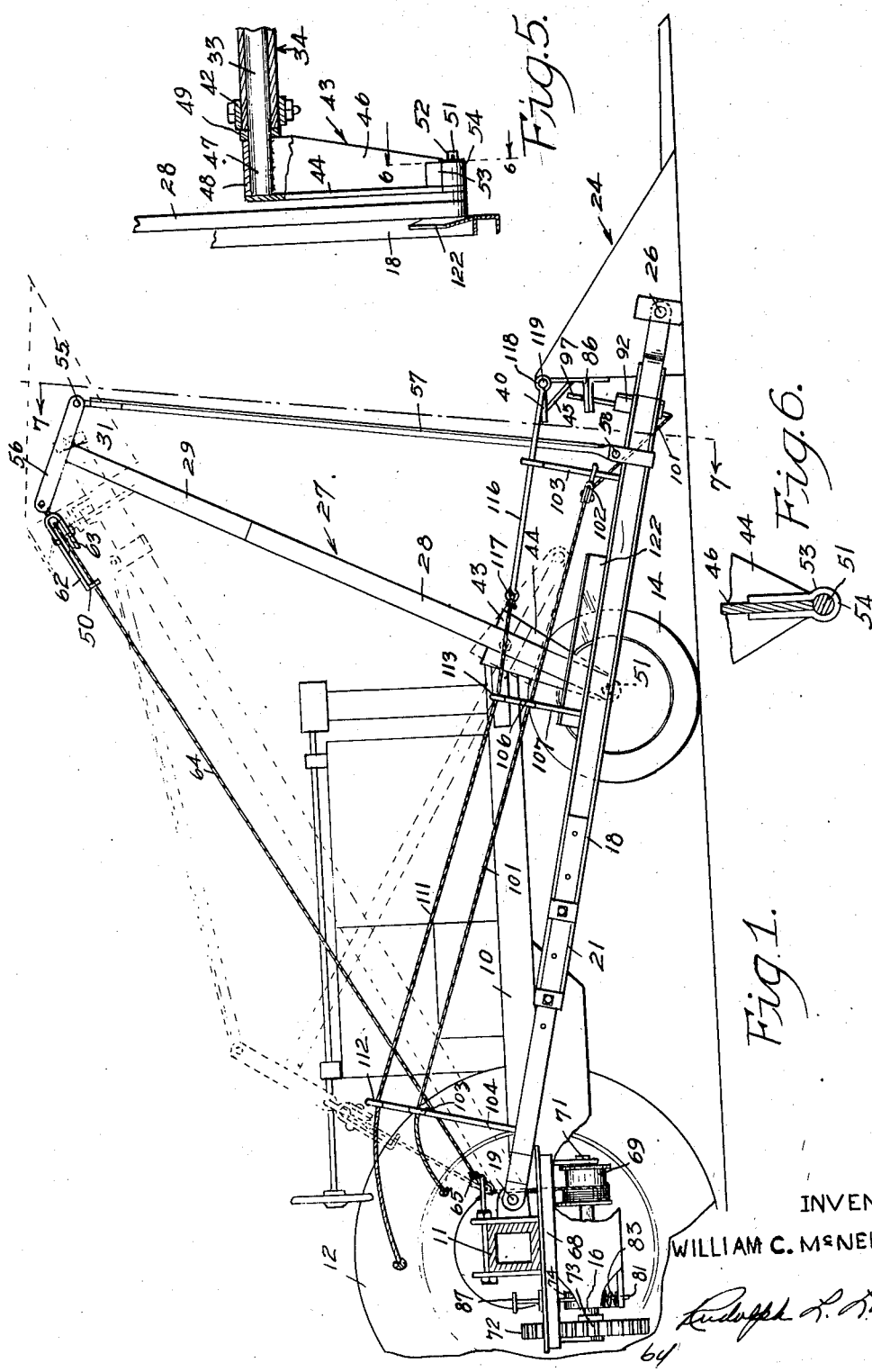

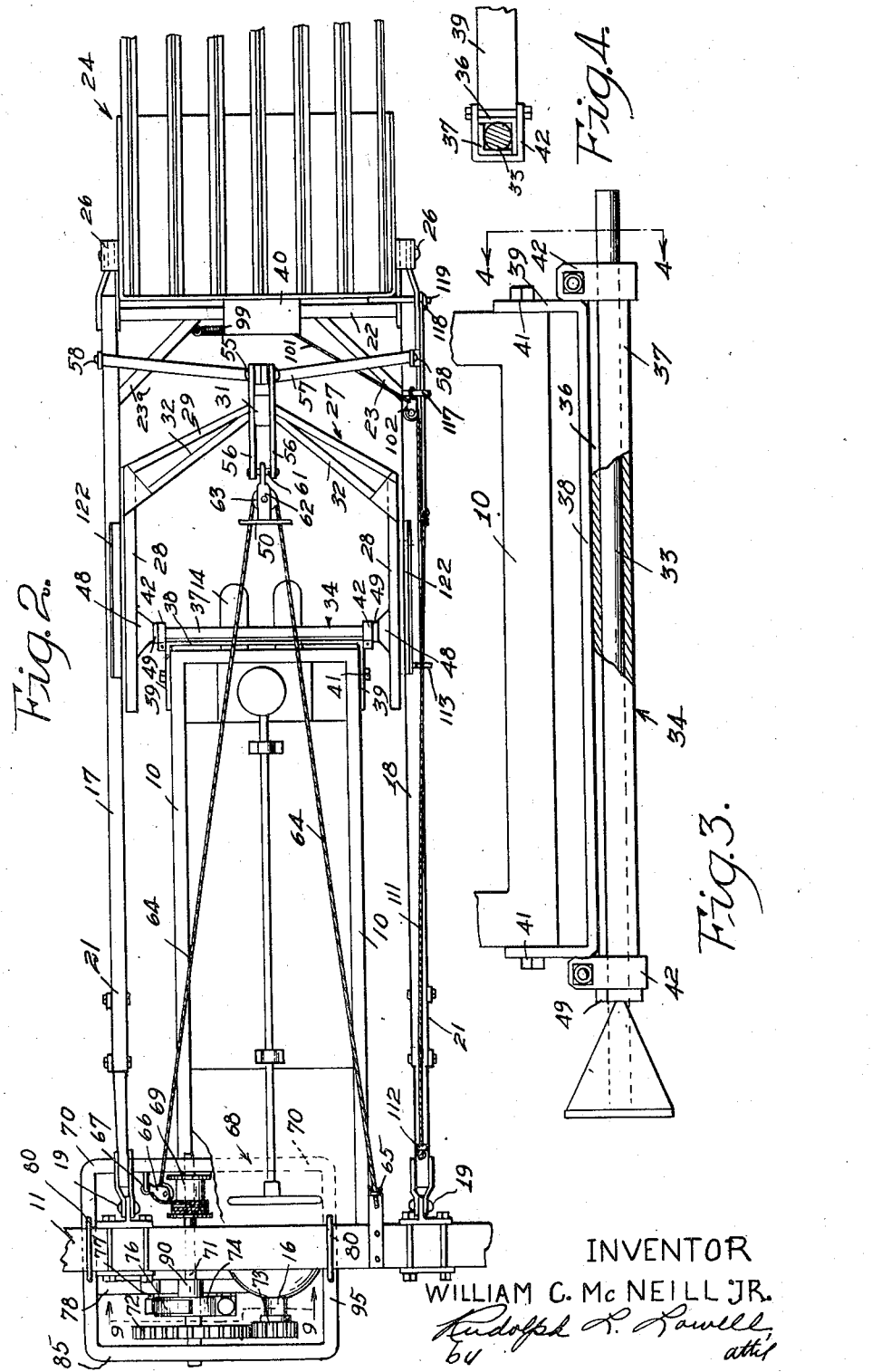

Patented Sept. 23, 1947

2,427,971

UNITED STATES PATENT OFFICE 2,427,971

LOADING MACHINE

William C. McNeill, Jr., Jamaica, Iowa

Application May 14, 1945, Serial No. 593,715

8 Claims. (Cl. 214—140)

This invention relates generally to loading machines and in particular to a tractor mounted loading attachment adapted to handle manure, snow, hay and the like.

An object of this invention is to provide an improved loading machine.

A further object of this invention is to provide a tractor mounted loading attachment adapted for assembly on the tractor in a manner to reduce the load-lifting force applied on the tractor front wheels.

Yet another object of this invention is to provide a tractor mounted loading attachment which is of a simple and compact design, readily mounted on farm tractors of different types and efficient in operation to handle heavy loads with only a relatively small amount of the power available from the tractor engine.

A feature of this invention is found in the provision of a tractor mounted loading attachment including a pair of pivoted lifting arms, in which a pivoted mast is pivotally supported at the front end of a tractor at the free ends of suspended rock arms arranged at opposite sides of the tractor for rockable movement longitudinally of the tractor. A bracing structure is pivotally connected between the top of the mast and the forward ends of the lifting arms, which are raised and lowered by a flexible lifting means operatively connected with the top of the mast and with a hoisting mechanism carried at the rear end of the tractor.

Yet another feature of this invention is found in the provision of an improved latching mechanism for a load supporting unit, which mechanism is protected from any material that might fall from the load supporting unit.

A further feature of this invention is found in the provision of a tractor mounted loading attachment including a pair of oppositely arranged lifting arms, in which a pivoted mast constitutes a guide for holding the lifting arms against lateral movement during their up and down pivotal movement.

Further objects, features and advantages of this invention will become apparent from the following description when taken in connection with the accompanying drawings in which:

Fig. 1 is a side elevational view of the loading attachment of this invention in assembly relation with a commercial type farm tractor, with certain parts being broken away to more clearly show such assembly;

Fig. 2 is a plan view of the assembly shown in Fig. 1;

Fig. 3 is an enlarged plan view of the rockable unit forming part of the loading attachment of this invention, showing the assembly of the rockable unit on the tractor frame and with parts thereof broken away to show its construction;

Fig. 4 is a sectional view taken on the line 4—4 in Fig. 3;

Fig. 5 is a fragmentary detail sectional view showing the pivotal assembly of a mast frame member with the rockable unit shown in Fig. 3;

Fig. 6 is a sectional view on line 6—6 in Fig. 5;

Fig. 7 is a sectional view as seen on the line 7—7 in Fig. 1;

Fig. 8 is a perspective view of the latching mechanism for the load supporting unit; and Fig. 9 is a sectional detail view of the brake means forming part of the hoisting mechanism, with such view being taken on the line 9—9 in Fig. 2.

With reference to the drawings the loading attachment of this invention is illustrated in Figs. 1 and 2 in assembly relation with a commercial type tractor including a frame 10, a rear axle 11 having rear wheels 12 mounted thereon and a front axle 13 with front wheels 14. The tractor is provided with a usual rear power take off indicated generally at 16.

The attachment comprises a pair of pivoted lifting arms or booms 17 and 18 arranged at opposite sides of the tractor frame 10 and having their rear ends pivoted at 19 on the rear axle 11. Each arm is formed with two sections adjustably connected together at 21 for adjustment of their length relative to the length of the tractor on which the attachment is to be used. The front ends of the arms 17 and 18 are extended forwardly of the tractor frame and are connected together by a transverse beam member 22, which is braced with the arms 17 and 18 by brace members 23a and 23. A load-supporting unit 24, illustrated in the drawings as a manure scoop, is pivoted at 26 between the front ends of the arms 17 and 18.

To pivotally raise and lower the arms 17 and 18 there is provided means including a pivoted mast 27 comprised of a pair of upright frame members 28 (Figs. 1 and 7) having inwardly and upwardly extended top sections 29 connected together at their upper ends by a transversely extended member 31. A brace member 32 is connected between the top sections 29 and a corresponding upright frame member 28. The top sections 29 and the braces 32 thus constitute a substantially inverted V-shaped frame structure for connecting together the upper ends of the members 28, with the transverse member 31 at the apex of the V forming a support for a purpose which will appear later.

The mast 27 is pivotally supported on a rockable unit including a transverse rock shaft 33 (Figs. 2 and 7) rotatably supported on the front end of the tractor frame 10 in an elongated bearing indicated generally as 34. The bearing 34 (Figs. 3 and 4) is comprised of a pair of angle iron members 36 and 37 arranged to form a box structure adapted to rotatably receive the shaft 33 therein. The angle member 36 has one leg welded to the forward side of a U-shaped bracket member 38, the legs 39 of which bracket are extended rearwardly for connection with the tractor frame 10 by means of bolts or the like 41. The angle member 37 is maintained in assembly relation with the angle member 36 by U-shaped clamp members 42 positioned to the outside of the bracket 38 as best appears in Figs. 2 and 3.

A pair of rock arms 43 are arranged at opposite ends of the rock shaft 33 and to each side of the tractor frame 10 and are normally suspended downwardly to a position below the front wheel axle 13. Each arm 43 includes an upright body member 44 (Fig. 5) of a plate form positioned flat against an end of the shaft 33, and a brace plate 46 welded longitudinally of the body member 44 and to the bottom side of an adjacent end portion 47 of the shaft 33. A stop plate 48 of a substantially triangular form, as appears in Fig. 2, is welded to the top side of the shaft end portion 47 and to the top inner edge of the body member 44. A collar 49 is mounted on the shaft 33 between the inner end of a stop plate 48 and the adjacent end of the shaft bearing 34.

In the assembly of the rockable unit the angle member 36 is welded to the bracket 38. The shaft 33, with the rocker arms 43 and collar 49 assembled thereon is then positioned within the angle or bearing member 36 with the collars 49 to the outside of the bearing member 34. The angle member 37 is then arranged in a mating relation with the angle member 36 and secured thereto by the clamp members 42. The shaft 33 is thus rotatably supported between the angle members 36 and 37, and is held against axial movement by the stop plates 48, with the collars 49 providing for a relative movement between the stop plates 48 and the bearing 44 without producing any excessive wear between these parts. This assembly is then connected with the tractor as a complete unit.

The lower end of each upright member 28 has a lateral pin 51 welded thereto (Figs. 5 and 6) with the outer end of the pin being flush with the outer side of an uprgiht member 28, while the inner end 52 is projected inwardly of a corresponding frame member 28. The pin 51 is rotatably supported in a U-shaped strap 53 (Fig. 5) having a bearing portion 54, with the legs of the member 53 being welded to opposite sides of the lower end of the brace plate 46. It is seen, therefore, that the mast 27 is pivotally supported on the pins 51 at a position normally below the front wheel axle 13.

The transverse member 31 at the top of the mast 27 carries a pair of spaced longitudinal members 56 which constitute a crosspiece at the top of the mast (Figs. 2 and 7). A pair of upright brace or strut members 57 have their upper ends pivotally supported at 55 between the members 56 and at the forward end thereof. The lower ends of the brace members 57 are pivotally connected at 58 with the forward ends of the lifting arms 17 and 18. The members 57 thus form a pivoted bracing or supporting structure which is pivotally connected between the top of the mast 27 and the forward ends of the lifting arms.

A pin 61 carried at the rear end of the members 56 movably supports a U-shaped bracket 62 which in turn rotatably carries a pulley 63 (Figs. 1 and 2). A lifting cable 64 is connected at one end 65 to the rear axle 11 adjacent the lifting arm 18. The cable 64 from its end 65 extends upwardly and forwardly to the pulley 63, and then rearwardly and downwardly from the pulley 63 about a guiding or idler pulley 66 supported in a swivel connection 67 carried on the front member 70 of a frame structure 68 which supports the hoisting mechanism. From the pulley 66 the cable 64 is wound about a winding drum 69 mounted on a shaft 71 suspended from the frame 68 adjacent to the lifting arm 17. It is thus seen that the connected end 65 of the cable 64 and the winding drum 69 are oppositely arranged at the rear end of the tractor frame 10, with the pulley 63 being located at the forward end of the tractor.

The frame 68 (Figs. 1, 2 and 9) is of a substantially rectangular form and supported in a horizontal plane below the rear axle 11 on clamps 80 connected to the rear axle. The shaft 71 extends longitudinally of the tractor and is rotatably supported at its ends in bearings (not shown) supported from the front frame member 70 and a rear frame member 85, and in a center bearing 90 carried on a cross member 78 suspended from side frame members 95 on brackets 100. The shaft 71 has a gear 72 mounted thereon which is in meshing engagement with a gear 73 mounted on the power take-off 16.

Also mounted on the shaft 71 is a brake drum 74 (Figs. 2 and 9) associated with a brake band 76 which is pivoted substantially intermediate its end on a pivot pin 77 carried on the cross frame member 78. A free end 79 of the brake band 76 is slidable on a push rod 81 which in turn is slidably supported in a bracket 82 carried on the cross frame member 78. The brake band end 79 is arranged between a stop collar 84 and a coil spring 83 mounted on the push rod 81. The spring 83 is retained under compression between the collar 84 and a lateral projection 86 at the bottom of the bracket 82. The push rod 81 extends to a position above the level of the rear axle 11 and is formed at its upper end with a foot pedal 87 which is readily accessible to the tractor operator.

In the operation of the loader assume the arms 17 and 18 to be in their lowered positions shown in Fig. 1. At this position of the arms the mast 27 is tipped forwardly in a supported position on the brace members 57. On the advance of the tractor to load the scoop 24 the bucking force is applied on the arms 17 and 18 and transmitted to the rear axle 11. When the scoop is filled the arms 17 and 18 are elevated by operating the power take-off 16 to wind the cable 64 about the winding drum 69. This operation of the power take-off provides for the rotation of the shaft 71 in a clockwise direction, as viewed in Fig. 9, whereby the brake drum 74 tends to spread the brake band 76 away from a frictionally engaging position with the drum. The brake drum thus rotates freely with the shaft 71 without interference from the brake band.

By virtue of the pivotal support of the mast 27 on the rocker arms 43, as the cable 64 is operated, the frame members 28 and the rocker arms 43 are pivotally moved together in longitudinally aligned positions about the shaft 33 as a pivot. Apparently due to the extension of the members 28 below the shaft 33, and the resultant increase in the length of such arms as compared to their support directly on the shaft 33, and to the rearward and downward direction of the pulling force applied to the top of the mast by the cable 64, it has been found that the weight applied on the front wheels 14 is relatively light. The lifting operation of the cable 64 is continued until the arms 17 and 18 are elevated to a desired height for dumping the scoop 24. As indicated by dotted lines in Fig. 1 a maximum elevation of the scoop 24 is limited by the approach of the cross members 56 to a position adjacent to the top of the tractor. The cable 64 is maintained in operative association with the pulley 63 by a lateral guide member 50 secured to the rear upper side of the bracket 62 as shown in Fig. 2.

When the scoop 24 has been elevated to a desired height it is retained in such position by merely stopping the operation of the power take-off 16. On stopping of the shaft 71 its rotation in a counter-clockwise direction, as viewed in Fig. 9, under the influence of the cable 64, is stopped by virtue of such rotation acting to assist the spring 83 to pull the brake band 76 into a frictionally engaging position with the brake drum 74. In order to lower the arms 17 and 18 the push rod 81 is merely pushed downwardly to in turn move the brake band end 79 away from the brake drum 74 whereby the frictional engagement of the brake band with the brake drum 74 is released. It is seen, therefore, that the arms 17 and 18 are power lifted and then lowered by a gravity controlled action in response to an actuation of the push rod 81.

As clearly appears in Fig. 7 the upright members 28 of the mast 27 are located between an adjacent lifting arm and a rock arm 43. During the elevation of the lifting arms 17 and 18 the upright members 28 are adapted to contact the inside surfaces of the lifting arms so as to retain the arms against lateral movement. With reference to Fig. 1 it is seen that the arms 17 and 18 in their lowered positions are substantially adjacent the bottom ends of the upright members 28. At this position of the arms, and in the event the tractor is operated over a rough ground surface, the arms 17 and 18 may move to positions below the bottom ends of the uprights 28. In order to support the arms 17 and 18 against lateral movement under this condition each lifting arm is provided with an upright guide plate 122 adjacent the inner side thereof and substantially opposite a corresponding upright member 28. Since the lower ends of the upright members 28 are spaced a distance above the ground to normally clear all obstructions encountered in an uneven ground surface, the guide plates 122 in conjunction with the upright members 28 provide for a continuous guiding of the lifting arms 17 and 18 against lateral movement at all pivotally moved positions of the arms.

The scoop 24 is releasably held in a loading position by a latching mechanism (Fig. 8) including a catch member 86 extended rearwardly from the rear wall 87 of the scoop 24. The catch 86 is of a length to extend beyond the rear side of the transverse beam member 22 which is connected between the forward ends of the lifting arms 17 and 18. Adjustably supported on the back side of the beam member 22 is a bracket member 88 comprised of a pair of transversely spaced angle members 89 having slots 91 formed in the leg portions 92 thereof which are positioned against the rear side of the frame member 22. Bolts 93 extended through the slots 91 and through the frame member 22 provide for an up and down adjustment of the bracket 88 in a manner which is believed to be obvious. Connected between the leg portions 94 of the angle members 89 is a pair of spaced transversely extended members 96. A latch 97 adapted for releasable engagement with the catch member 86, is pivotally movable between the plate members 96 and is pivotally supported on a pin 98 extended through the plate members 96. It is seen, therefore, that the latch member 97 is pivotally movable transversely of the arms 17 and 18 into and out of operative engagement with the catch member 86, with adjustment of the bracket 88 providing for the adjustment of the scoop relative to the ground surface.

The latch 97 is yieldably urged to and held in a catch-engaging position by a tension spring 99 connected between the latch 97, and the brace member 23a and is manually actuated to a catch-releasing position by means including a cable 101 connected at one end to the latch 97 and then extended about a pulley 102 which is swively supported on an upright rod 103 carried on the arm 18 (Figs. 1 and 8). From the pulley 102 the cable 101 extends rearwardly above the arm 18 through a loop 103 in an upright rod 104 carried at the rear end of the arm 18. The length of the cable 101 between the pulley 102 and the upright rod 104 is movably supported in a loop 106 provided in an upright rod 107 located on the arm 18 intermediate its ends. To release the scoop 24 for dumping, therefore, it is only necessary for the tractor operator to pull rearwardly on the cable 101, with the latch 97 being returned to a catch-engaging position by the action of the spring 99. The dumping movement of the scoop is limited by the provision of a pair of chains 109 connected between the back wall 87 of the scoop and the beam member 22.

The scoop 24, after being dumped, is manually returned to a loading position by a pull rope 111 (Figs. 1 and 6) connected at its rear end to a loop 112 on the upright 104 and at its forward end to the rear end of a rod 116 slidably supported in a loop 117 formed at the upper end of the upright 103. The pull rope 111 intermediate its ends is slidable in a loop 113 on the upright rod 107. The forward end 118 of the rod 116 is of a loop form adapted to loosely receive a pin member 119 extended laterally from the back wall 87 of the scoop 24. The rod 116 and pin 119 are maintained in relative assembly by a usual cotter key 121. With reference to Fig. 8 is is seen that the latch 97 is pivotally movable between the plate members 96. In order to prevent any material, such as dirt or manure, falling from the scoop 24 between the members 96, where such material would interfere with a free pivotal movement of the latch 97, a shield 40 is extended rearwardly from the scoop back wall 87 in a spaced relation above the latching mechanism. Brace members 45 support the shield 40 against the scoop.

From a consideration of the above description it is seen that the invention provides a loader attachment which is of a simple and compact construction and readily adaptable to be assembled on various types of farm tractors. The pivotal support of the mast 27 on the free ends of the depending rock arms 43 provides for an increased leverage action of such arms in the lifting of a load carried on the arms 17 and 18, which in conjunction with the downward and rearward pulling action of the cable 64 on the top of the mast, appreciably reduces the force applied downwardly on the front wheels 14 during a lifting operation. Also the pivotal connection of the upright members 28 at the lower ends of the rock arms 43 provides for the holding of the lifting arms 17 and 18 against lateral movement at substantially all moved positions thereof. Further the arrangement of the latching mechanism with the latch 97 operated in a plane transversely of the arms 17 and 18 into and out of operative engagement with the catch member 86 provides a positive locking action since the catch member 86 is incapable of applying an upward force on the latch 97 which would tend to pivotally move the latch out of an engaging position therewith.

Although the invention has been described with respect to a preferred embodiment thereof it is to be understood that it is not to be so limited since changes and modifications can be made therein which are within the full intended scope of this invention as defined in the appended claims.

I claim:

1. A loading machine comprising a portable frame, a pair of pivoted lifting arms arranged at opposite sides of said frame and pivoted at their rear ends on said frame for up and down movement, a load-supporting unit carried between the forward ends of said arms, means for elevating and lowering said arms comprising a transverse rock shaft movably supported adjacent the forward end of said frame, a pair of downwardly extended supporting members at opposite ends of said shaft, a pivoted mast comprising a pair of upright frame members connected together at their upper ends and having their lower ends pivoted adjacent the free ends of said supporting members, a pivoted bracing structure pivotally connected at one end to the top of said mast, and at its opposite end to the forward ends of said lifting arms, a hoist mechanism supported on said portable frame, including a winding drum, and a flexible lifting means operatively associated with said winding drum and connected with the top of said mast.

2. A loading machine comprising a portable frame, a pair of pivoted lifting arms arranged at opposite sides of said frame, a load-supporting unit carried between the forward ends of said arms, a rockable unit movably supported adjacent the front end of said frame including a pair of downwardly extended rock arms at opposite sides of the frame and rockable longitudinally of the frame, a pivoted mast pivotally supported at its lower end adjacent the free ends of said rock arms, a pivoted frame structure pivotally connected between the forward ends of said arms and the top of said mast, a hoisting mechanism on said frame, and a flexible lifting means operatively connected to said hoisting mechanism and to said mast adjacent the top thereof.

3. A loading attachment adapted to be mounted on a tractor having a front wheel axle, said attachment comprising a pair of pivoted lifting arms arranged at opposite sides of the tractor and pivoted at their rear ends on the tractor, a load-supporting unit carried between the forward ends of said lifting arms, a pivoted mast comprising a pair of upright members, means connecting together the upper ends of said upright members, a transverse rock shaft rockably supported adjacent the front end of said tractor, rock arms at opposite ends of said shaft extended downwardly below the level of said front wheel axle, means pivotally supporting the lower ends of said upright members adjacent the free ends of said rock arms, a pivoted brace structure pivotally connected at one end with said connecting means, and at its opposite end to the forward ends of said lifting arms, a hoist mechanism on said tractor, and a flexible lifting means movably supported on said connecting means and operatively associated with said hoist mechanism.

4. A loading machine comprising a portable frame, a pair of pivoted lifting arms arranged at opposite sides of said frame, a load-supporting unit carried between the forward ends of said arms, a pivoted upright frame, a rockable unit rockably supported adjacent the front end of said portable frame including a pair of depending rock arms arranged at opposite sides of said portable frame and rockable longitudinally of said portable frame, means pivotally supporting said upright frame on the free ends of said rock arms, a longitudinally extended crosspiece at the top of said upright frame, a pivoted bracing structure pivotally connected to the front end of said cross-piece and to the forward ends of said lifting arms, a pulley rotatably supported from the rear end of said crosspiece for rotation in a substantially horizontal plane, a hoisting mechanism on said portable frame, and a flexible lifting means movably supported on said pulley and operatively associated with said hoisting mechanism.

5. A loading attachment adapted to be mounted on a tractor having a front wheel axle, said attachment comprising a pair of pivoted lifting arms arranged at opposite sides of the tractor and pivoted at their rear ends on the tractor, a load-supporting unit carried between the forward ends of said arms, a pivoted mast comprising a pair of upright frame members, means connecting together the upper ends of said upright frame members, a transverse rock shaft supported at the front end of said tractor, a pair of rock arms at opposite ends of said shaft extended downwardly below the level of said front wheel axle, means pivotally supporting said pivoted mast adjacent the free ends of said rock arms, a bracing frame pivotally connected between said connecting means and the forward ends of said lifting arms, a hoisting mechanism on said tractor, and a flexible lifting means movably supported on said connecting means and operatively associated with said hoisting mechanism, said upright members and rockable unit being arranged between said lifting arms with said upright members in contact engagement with corresponding lifting arms to guide said lifting arms in their pivotal movement against lateral movement.

6. A loading attachment adapted to be mounted on a tractor, said attachment comprising a pair of pivoted lifting arms arranged at opposite sides of said tractor and pivoted at their rear ends on said tractor, a load-supporting unit carried between the forward ends of said arms, a transverse rock shaft supported adjacent the forward end of said tractor, a pair of downwardly extended rock arms at opposite ends of said shaft, a pivoted mast comprising a pair of upright frame members, means pivotally supporting the lower ends of said frame members on the free ends of said rock arms, said frame members being arranged between a corresponding lifting arm and rock arm and in contact engagement with said lifting arms to guide them against lateral movement, upright guide plates on said lifting arms engageable with the lower ends of said upright frame members to hold the lifting arms against lateral movement in a lowered position below the bottom ends of said upright frame members, a pivoted brace structure pivotally connected between the top of said upright frame and the forward ends of said lifting arms, and means for pivotally moving said mast longitudinally of said tractor to raise and lower said lifting arms.

7. In a loading machine including a portable frame, a pair of pivoted lifting arms arranged at opposite sides of said frame, a load-supporting unit carried between the forward ends of said arms, a transverse beam member connected between said forward ends rearwardly of said load-supporting unit, a latching mechanism for releasably holding said unit in a load-supporting position including a catch member projected rearwardly from said load-supporting unit, means adjustably supported on said beam for up and down movement, means pivotally supporting said latch on said adjustable means for pivotal movement transversely of said portable frame into and out of releasable engagement with said catch member, manually operated means for pivotally moving said latch in one direction to release said load-supporting unit, tension means for pivotally moving said latch in an opposite direction to a position for engaging said catch member, and a cover member extended rearwardly from said load-supporting unit in a spaced relation above said catch member to shield said latching mecha-nism against material dropping from said load-supporting unit.

8. In a loading machine including a portable frame, a pair of pivoted lifting arms arranged at opposite sides of said frame, a load-supporting unit carried between the forward ends of said arms, a transverse beam member connected between said forward ends rearwardly of said load-supporting unit, a latching mechanism for releasably holding said unit in a load-supporting position including a catch member projected rearwardly from said load-supporting unit, a latch means pivotally supporting said latch on said transverse beam member for pivotal movement into and out of releasable engagement with said catch member, manually operated means for pivotally moving said latch in one direction to release said load-supporting unit, tension means for pivotally moving said latch in an opposite direction to a position for engaging said catch member, and a cover member extended rearwardly from said load-supporting unit in a spaced relation above said catch member to shield said latching mechanism against material dropping from said load-supporting unit.

WILLIAM C. McNEILL, Jr.

REFERENCES CITED

The following references are of record in the file of this patent:

UNITED STATES PATENTS

| Number | Name | Date |
| --- | --- | --- |
| 781,166 | Scott et al. | Jan. 31, 1905 |
| 1,285,624 | Clark | Nov. 26, 1918 |
| 2,109,440 | Villerup | Feb. 22, 1938 |
| 2,246,083 | Weber | June 17, 1941 |
| 2,367,932 | Dunn | Jan. 23, 1945 |
| 2,403,808 | Laughead | July 9, 1946 |